(12) United States Patent
Graves et al.

(10) Patent No.: US 9,662,537 B1
(45) Date of Patent: May 30, 2017

(54) EXERCISE ATTACHMENT APPARATUS

(71) Applicants: Tony Graves, Bakersfield, CA (US); Ryan Kinser, Bakersfield, CA (US)

(72) Inventors: Tony Graves, Bakersfield, CA (US); Ryan Kinser, Bakersfield, CA (US)

( * ) Notice: Subject to any disclaimer, the term of this patent is extended or adjusted under 35 U.S.C. 154(b) by 0 days.

(21) Appl. No.: 15/069,481

(22) Filed: Mar. 14, 2016

(51) Int. Cl.
| | | |
|---|---|---|
| *A63B 1/00* | (2006.01) |
| *A63B 21/00* | (2006.01) |
| *A63B 23/12* | (2006.01) |
| *A63B 21/068* | (2006.01) |
| *A63B 23/02* | (2006.01) |

(52) U.S. Cl.
CPC .... *A63B 23/1218* (2013.01); *A63B 21/00047* (2013.01); *A63B 21/068* (2013.01); *A63B 21/4035* (2015.10); *A63B 23/02* (2013.01); *A63B 2210/50* (2013.01)

(58) Field of Classification Search
CPC .......... A63B 23/1218; A63B 21/00047; A63B 21/4035; A63B 23/02; A63B 21/068; A63B 2210/50
USPC ....................................... 482/38–43, 92–109
See application file for complete search history.

(56) References Cited

U.S. PATENT DOCUMENTS

| | | | | | |
|---|---|---|---|---|---|
| 2,405,024 | A | * | 7/1946 | Eynon ................ | A63B 22/0076 482/131 |
| 3,874,657 | A | * | 4/1975 | Niebojewski .......... | A63B 17/00 482/104 |
| 4,098,502 | A | * | 7/1978 | Faust ..................... | A63B 23/00 482/104 |
| 4,211,403 | A | * | 7/1980 | Coffaro .................. | A63B 17/00 482/104 |
| 4,337,942 | A | * | 7/1982 | Sidlinger ................. | A63B 5/11 482/142 |
| 4,423,865 | A | * | 1/1984 | Mahnke ............. | A63B 21/4029 297/377 |
| 4,527,797 | A | * | 7/1985 | Slade, Jr. ............. | A63B 21/078 482/101 |
| 4,537,395 | A | * | 8/1985 | Spinelli ................ | A63B 21/078 482/104 |
| 4,934,693 | A | * | 6/1990 | Santoro ............. | A63B 21/0626 482/104 |
| 5,082,259 | A | * | 1/1992 | Gonzalez ........... | A63B 23/0355 482/104 |
| 5,302,164 | A | * | 4/1994 | Austin ............... | A63B 21/0023 482/39 |
| 6,050,548 | A | * | 4/2000 | Leger ..................... | B66C 23/48 254/326 |

(Continued)

*Primary Examiner* — Stephen Crow
*Assistant Examiner* — Garrett Atkinson
(74) *Attorney, Agent, or Firm* — Stevenson IP, LLC

(57) ABSTRACT

An exercise attachment apparatus including a pair of spaced vertically disposed hollow base supports having a plurality of spaced first apertures. A horizontally disposed cross support has a plurality of spaced second apertures and is attached to the pair of base supports with a pair of screws slidably securable through one of the plurality of first apertures and one of the plurality of second apertures. One of a pair of tubular sleeves is continuously disposed through one of a pair of openings disposed through the pair of base supports. One of a pair of tubular rods is slidably engageable through one of the pair of sleeves. One of a pair of hooks is attached to a front side of one of the pair of base supports, and one of a pair of padded supports is slidably moveable along one of the pair of rods.

6 Claims, 8 Drawing Sheets

(56) References Cited

U.S. PATENT DOCUMENTS

| | | | | |
|---|---|---|---|---|
| 6,090,021 A | * | 7/2000 | Flowers | A63B 21/078 482/104 |
| 6,685,601 B1 | * | 2/2004 | Knapp | A63B 21/078 482/104 |
| 7,104,938 B1 | * | 9/2006 | Smith | A63B 21/06 482/104 |
| 7,393,309 B2 | * | 7/2008 | Webber | A63B 21/078 482/104 |
| 7,736,286 B2 | * | 6/2010 | Panaiotov | A63B 21/0552 482/121 |
| 8,757,455 B2 | * | 6/2014 | Smalley | A41D 7/00 2/67 |
| 9,308,409 B2 | * | 4/2016 | Beaver | A63B 23/0458 |
| 2005/0272574 A1 | * | 12/2005 | Lessard | A63B 21/078 482/104 |
| 2009/0215594 A1 | * | 8/2009 | Panaiotov | A63B 21/0552 482/130 |
| 2010/0048368 A1 | * | 2/2010 | Donofrio | A63B 1/00 482/130 |
| 2011/0028280 A1 | * | 2/2011 | Adams | A63B 21/154 482/94 |
| 2011/0195822 A1 | * | 8/2011 | Donofrio | A63B 1/00 482/93 |
| 2012/0329613 A1 | * | 12/2012 | Schiano | A63B 21/078 482/94 |
| 2013/0102443 A1 | * | 4/2013 | Lundquist | A63B 21/068 482/93 |
| 2015/0290488 A1 | * | 10/2015 | Hopperstad | A63B 21/078 482/38 |

* cited by examiner

EXERCISE ATTACHMENT APPARATUS

BACKGROUND OF THE INVENTION

Various types of exercise apparatuses are known in the prior art. However, what has been needed is an exercise attachment apparatus including a pair of spaced vertically disposed hollow base supports having a plurality of spaced first apertures. What has been further needed is a horizontally disposed cross support having a plurality of spaced second apertures, with the cross support attached to the pair of base supports with a pair of screws slidably securable through one of the plurality of first apertures and one of the plurality of second apertures. Lastly, what has been needed is for one of a pair of tubular sleeves to be continuously disposed through one of a pair of openings disposed through the pair of base supports, one of a pair of tubular rods to be slidably engageable through one of the pair of sleeves, one of a pair of hooks to be attached to a front side of one of the pair of base supports, and one of a pair of padded supports to be slidably moveable along one of the pair of rods. A pull-up bar frame and, alternately, any piece of exercise equipment having a rack and bar, is selectively slidably engageable within the cavity of the pair of base supports from the top end to the pair of sleeves. The exercise attachment apparatus thus provides a user with a convenient and space-saving way to achieve an abdominal and upper body workout, since it secures to any piece of exercise equipment having a rack and bar. The apparatus is different from other exercise equipment since it is attachable to a preexisting piece of exercise equipment and does not require the user to separately store it when not in use.

FIELD OF THE INVENTION

The present invention relates to exercise apparatuses, and more particularly, to an exercise attachment apparatus.

SUMMARY OF THE INVENTION

The general purpose of the present exercise attachment apparatus, described subsequently in greater detail, is to provide an exercise attachment apparatus which has many novel features that result in an exercise attachment apparatus which is not anticipated, rendered obvious, suggested, or even implied by prior art, either alone or in combination thereof.

To accomplish this, the present exercise attachment apparatus includes a pair of spaced vertically disposed hollow base supports including a right base support and a left base support. Each of the right base support and the left base support has an open top end, a bottom end, a front side, a back side, a cavity disposed from the top end to the bottom end, and a plurality of spaced circular first apertures disposed from the front side to the back side proximal the bottom end. A horizontally disposed cross support has a right end, a left end, a front surface, a rear surface, and a plurality of spaced circular second apertures disposed from the front surface to the rear surface proximal each of the right end and the left end. A diameter of each of the plurality of first apertures is equal to a diameter of each of the plurality of second apertures. A pair of screws includes a right screw and a left screw, with each of the right screw and the left screw having a knobbed head and a length greater than a combined width of one of the pair of base supports and the cross support. Each of the right screw and the left screw is selectively slidably securable through one of the plurality of first apertures and one of the plurality of second apertures proximal the cross support right end and the cross support left end, respectively, in order to secure the cross support to the pair of base supports.

The exercise attachment apparatus further includes a pair of openings including a right opening and a left opening. Each of the right opening and the left opening is disposed through the right base support and the left base support, respectively, from the front side to the back side proximal the top end. A pair of tubular sleeves includes a right sleeve and a left sleeve. Each of the right sleeve and the left sleeve is continuously disposed through the right opening and the left opening, respectively. A pair of tubular rods includes a right rod and a left rod, with each of the right rod and the left rod having a rear end slidably engageable through the right sleeve and the left sleeve, respectively, in order to secure the pair of rods to the pair of base supports. A pair of frontward facing hooks includes a right hook and a left hook. Each of the right hook and the left hook has a back surface attached to the front side of each of the right base support and the left base support, respectively, proximal the top end.

The exercise attachment apparatus includes a pair of padded supports including a right padded support and a left padded support. Each of the right padded support and the left padded support is slidably moveable along the right rod and the left rod, respectively. The pair of padded supports provides a user with the ability to rest his arms on the pair of rods as desired. A pull-up bar frame and, alternately, any piece of exercise equipment having a rack and bar, is selectively slidably engageable within the cavity of the pair of base supports from the top end to the pair of sleeves. The pair of padded supports thus provides a user with the ability to rest his arms on the pair of rods while engaging in an exercise activity using the rack and bar. Each of the pair of padded supports is optionally rectangular and rubberized in order to provide the user with both a larger surface area and a stronger gripping surface to rest his arms. Additionally, each of the pair of base supports, the cross support, and each of the pair of rods is optionally steel to ensure the strength of the apparatus.

Lastly, the exercise attachment apparatus optionally includes a pair of stabilizing lower attachment members including a right stabilizing lower attachment member and a left stabilizing lower attachment member. Each of the right stabilizing lower attachment member and the left stabilizing lower attachment member has a hollow triangulated base portion and a vertical extension member. The vertical extension member has a top area, a front area, a rear area, a front slot disposed on the front area proximal the top area, and a rear slot disposed on the rear area proximal the top area. The top area of each of the right stabilizing lower attachment member and the left stabilizing lower attachment member is telescopically and removably attachable to the bottom end of the right base support and the left base support, respectively. The optional pair of stabilizing lower attachment members provides further stability to the apparatus, and the front slot and the rear slot of each of the right stabilizing lower attachment member and the left stabilizing lower attachment member ensures that the attachment members can freely move within the pair of base supports.

Thus has been broadly outlined the more important features of the present exercise attachment apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
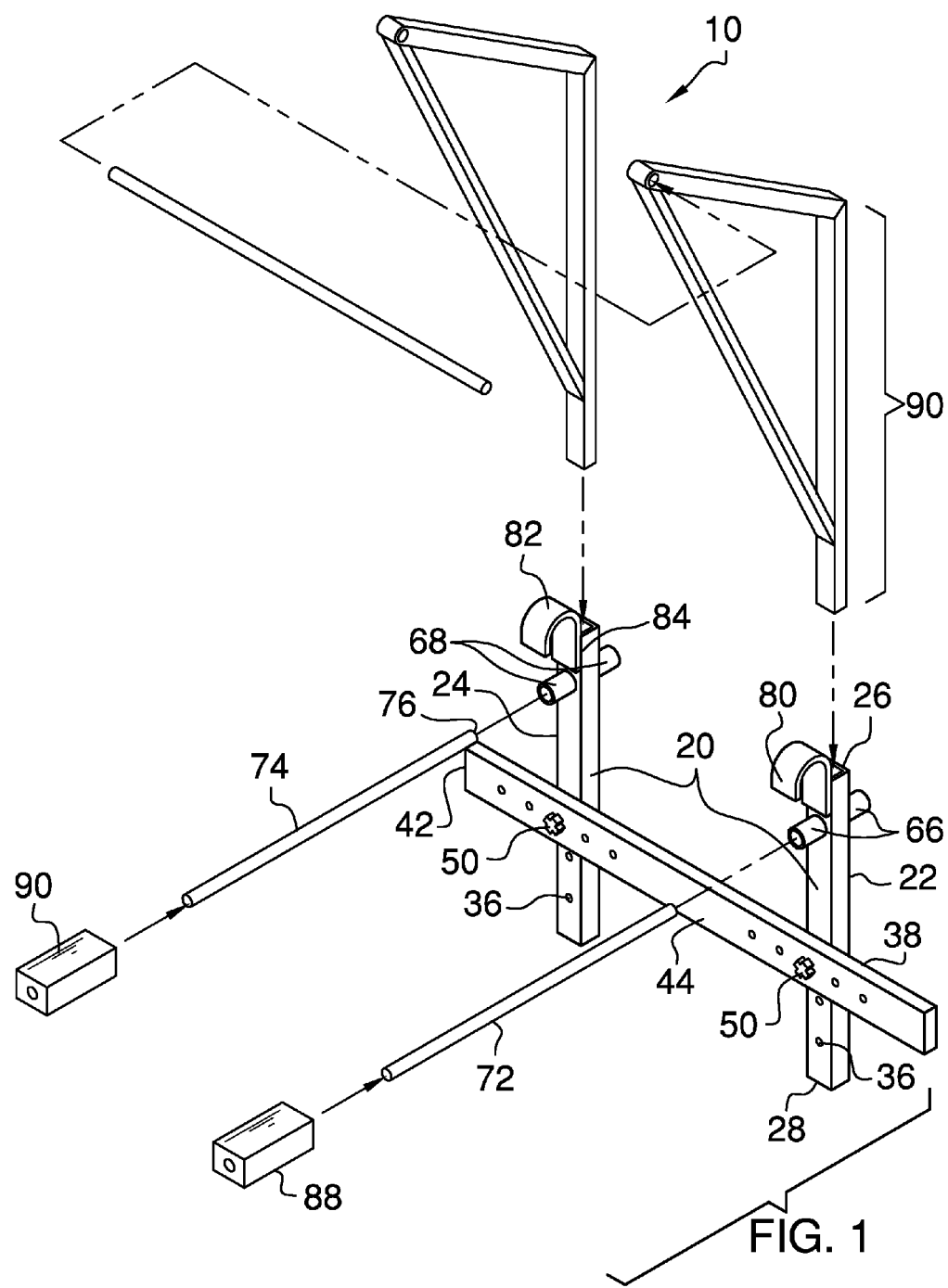
FIG. 1 is an exploded view.
Figure 2:
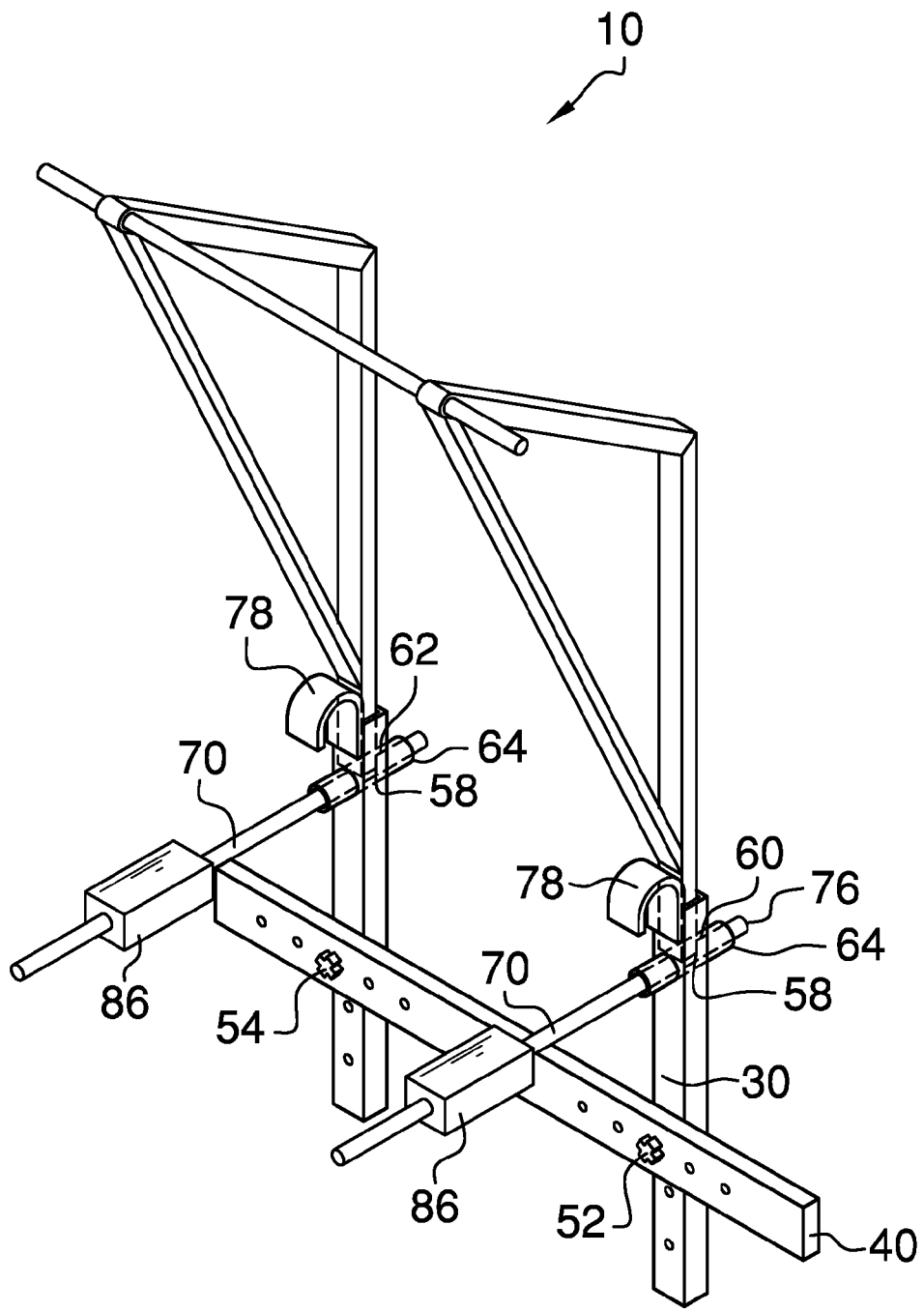
FIG. 2 is a front isometric view.
Figure 3:
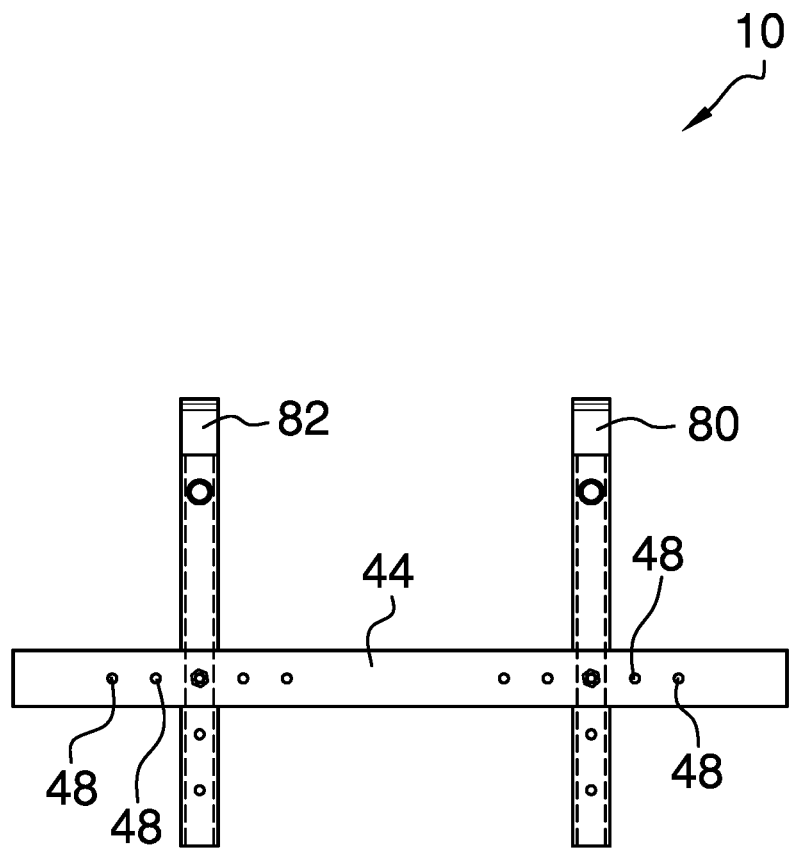
FIG. 3 is a front elevation view.
Figure 4:
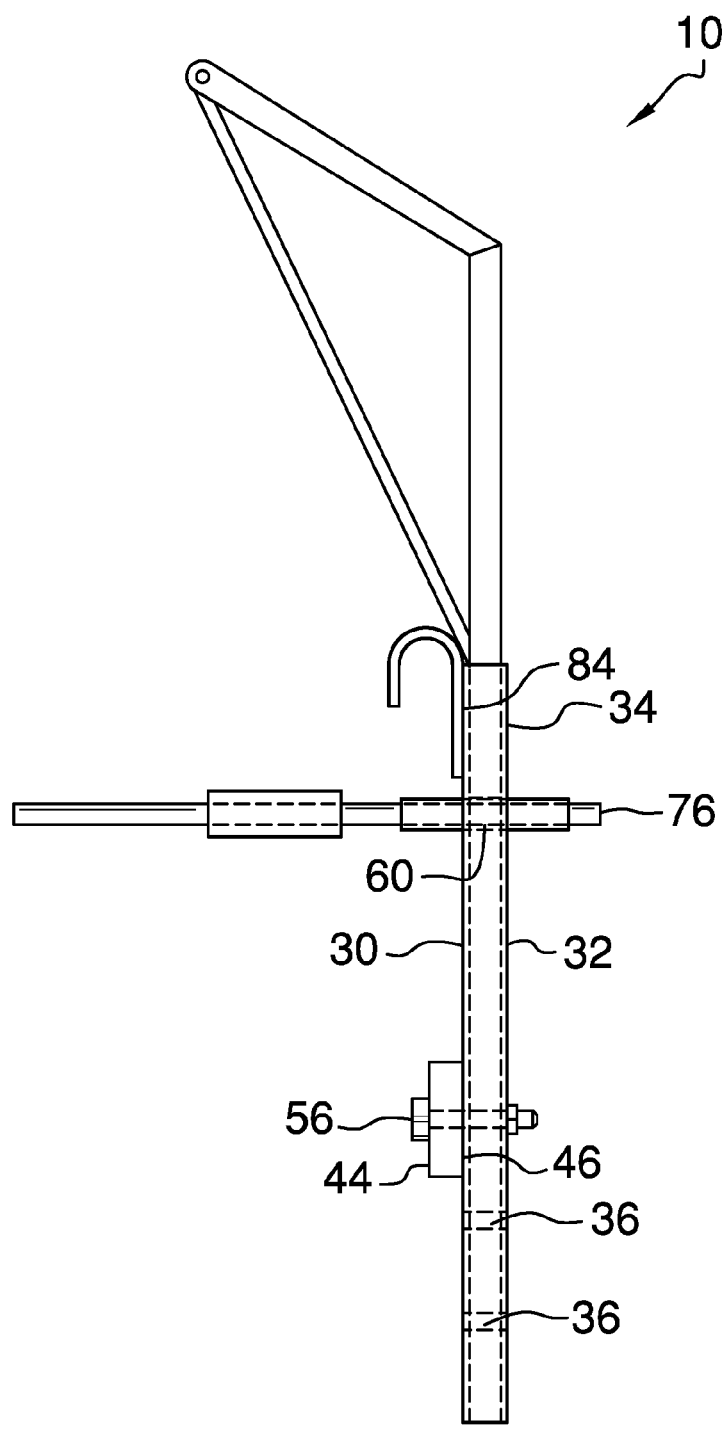
FIG. 4 is a side elevation view.
Figure 5:
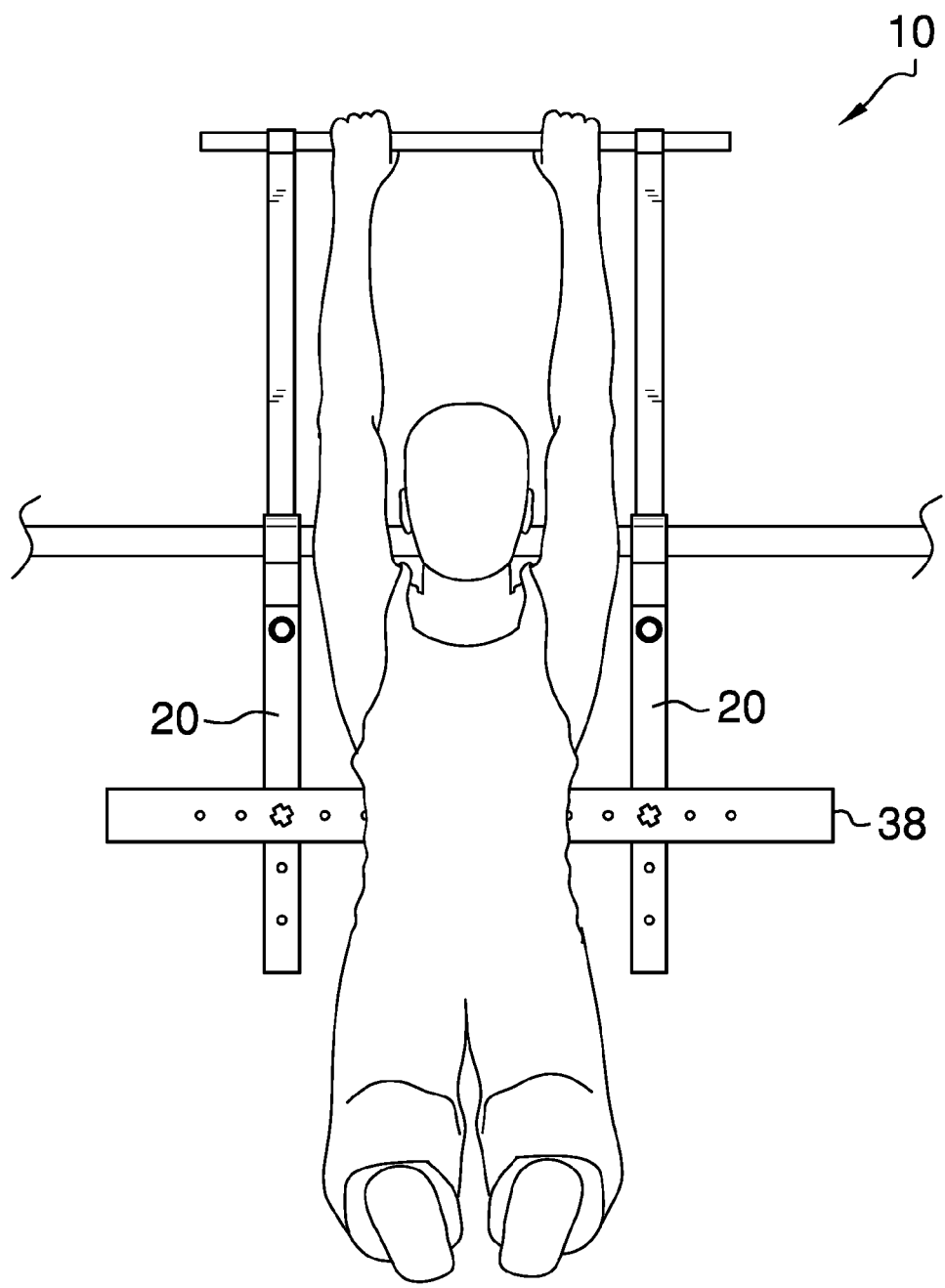
FIG. 5 is an in use view.
Figure 6:
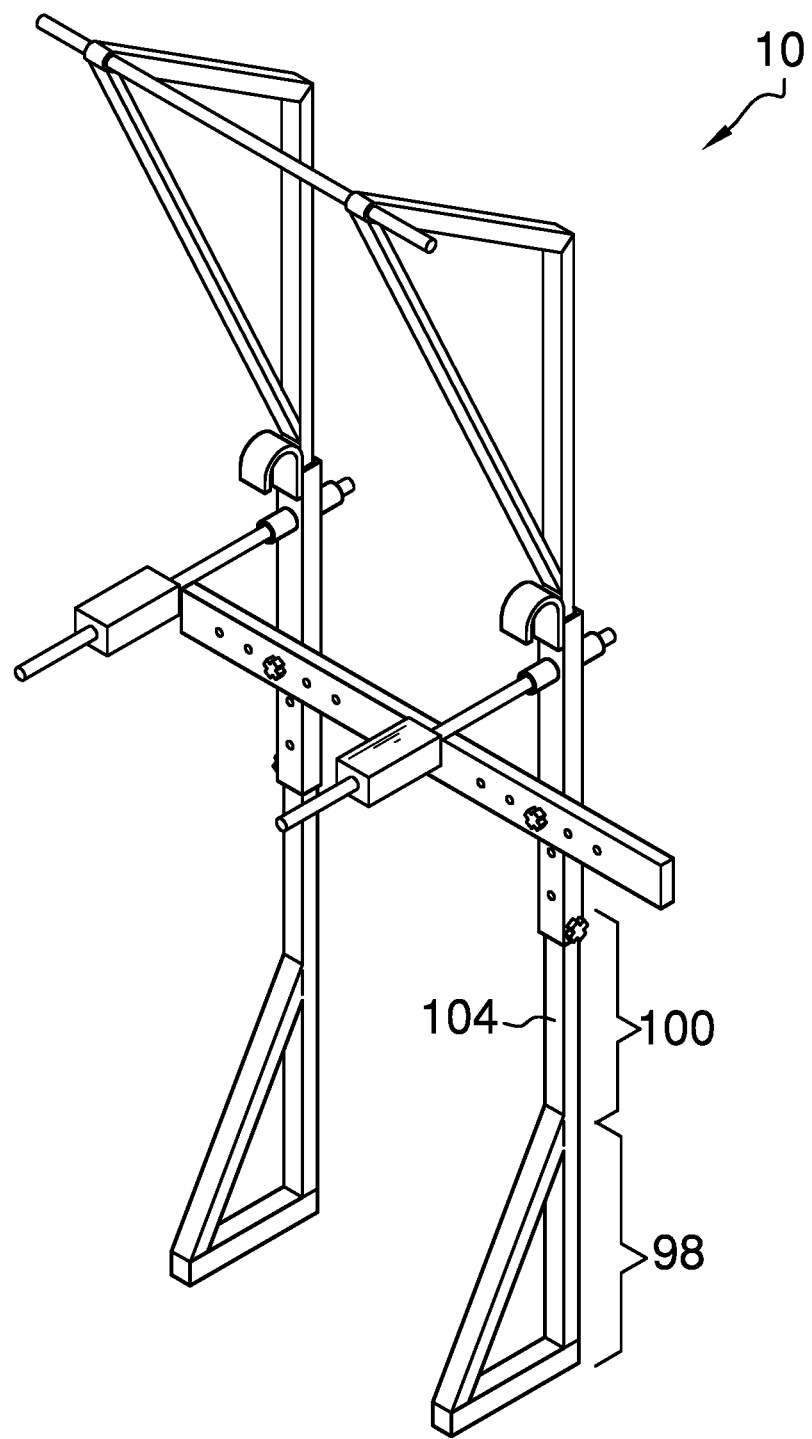
FIG. 6 is an isometric view showing a pair of stabilizing lower attachment members.
Figure 7:
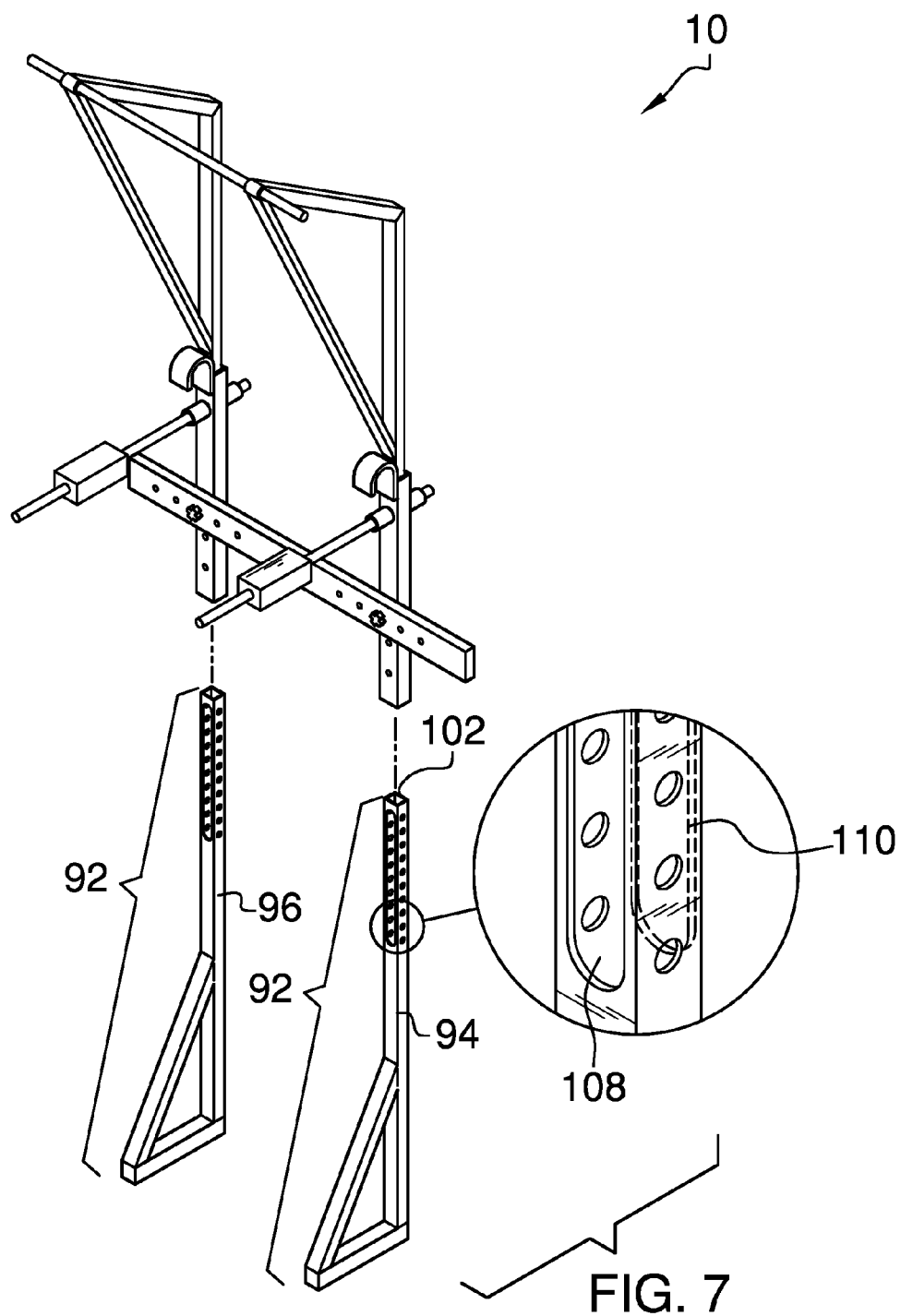
FIG. 7 is a detail view showing a front slot.
Figure 8:
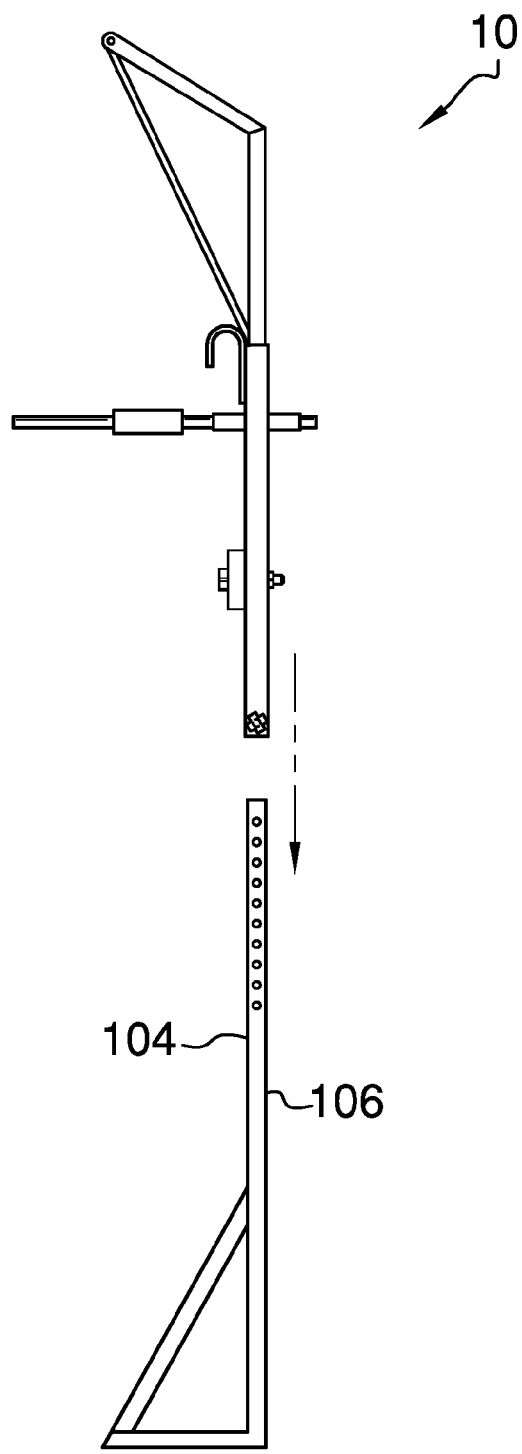
FIG. 8 is a side elevation view showing a right stabilizing lower attachment member.

With reference now to the drawings, and in particular FIGS. 1 through 8 thereof, an example of the instant exercise attachment apparatus employing the principles and concepts of the present exercise attachment apparatus and generally designated by the reference number 10 will be described.

Referring to FIGS. 1 through 8 the present exercise attachment apparatus 10 is illustrated. The exercise attachment apparatus 10 includes a pair of spaced vertically disposed hollow base supports 20 including a right base support 22 and a left base support 24. Each of the right base support 22 and the left base support 24 has an open top end 26, a bottom end 28, a front side 30, a back side 32, a cavity 34 disposed from the top end 26 to the bottom end 28, and a plurality of spaced circular first apertures 36 disposed from the front side 30 to the back side 32 proximal the bottom end 28. A horizontally disposed cross support 38 has a right end 40, a left end 42, a front surface 44, a rear surface 46, and a plurality of spaced circular second apertures 48 disposed from the front surface 44 to the rear surface 46 proximal each of the right end 40 and the left end 42. A diameter of each of the plurality of first apertures 36 is equal to a diameter of each of the plurality of second apertures 48. A pair of screws 50 includes a right screw 52 and a left screw 54, with each of the right screw 52 and the left screw 54 having a knobbed head 56 and a length greater than a combined width of one of the pair of base supports 20 and the cross support 38. Each of the right screw 52 and the left screw 54 is selectively slidably securable through one of the plurality of first apertures 36 and one of the plurality of second apertures 48 proximal the cross support right end 40 and the cross support left end 42, respectively.

The exercise attachment apparatus further includes a pair of openings 58 including a right opening 60 and a left opening 62. Each of the right opening 60 and the left opening 62 is disposed through the right base support 22 and the left base support 24, respectively, from the front side 30 to the back side 32 proximal the top end 26. A pair of tubular sleeves 64 includes a right sleeve 66 and a left sleeve 68. Each of the right sleeve 66 and the left sleeve 68 is continuously disposed through the right opening 60 and the left opening 62, respectively. A pair of tubular rods 70 includes a right rod 72 and a left rod 74, with each of the right rod 72 and the left rod 74 having a rear end 76 slidably engageable through the right sleeve 66 and the left sleeve 68, respectively. A pair of frontward facing hooks 78 includes a right hook 80 and a left hook 82. Each of the right hook 80 and the left hook 82 has a back surface 84 attached to the front side 30 of each of the right base support 22 and the left base support 24, respectively, proximal the top end 26.

The exercise attachment apparatus 10 includes a pair of padded supports 86 including a right padded support 88 and a left padded support 90. Each of the right padded support 88 and the left padded support 90 is slidably moveable along the right rod 72 and the left rod 74, respectively. A pull-up bar frame 90 is selectively slidably engageable within the cavity 34 of the pair of base supports 20 from the top end 26 to the pair of sleeves 64. Each of the pair of padded supports 86 is optionally rectangular and rubberized. Each of the pair of base supports 20, the cross support 38, and each of the pair of rods 70 is optionally steel.

Lastly, the exercise attachment apparatus 10 optionally includes a pair of stabilizing lower attachment members 92 including a right stabilizing lower attachment member 94 and a left stabilizing lower attachment member 96. Each of the right stabilizing lower attachment member 94 and the left stabilizing lower attachment member 96 has a hollow triangulated base portion 98 and a vertical extension member 100. The vertical extension member 100 has a top area 102, a front area 104, a rear area 106, a front slot 108 disposed on the front area 104 proximal the top area 102, and a rear slot 110 disposed on the rear area 106 proximal the top area 102. The top area 102 of each of the right stabilizing lower attachment member 94 and the left stabilizing lower attachment member 96 is telescopically and removably attachable to the bottom end 28 of the right base support 22 and the left base support 24, respectively.

What is claimed is:

1. An exercise attachment apparatus comprising:
   a pair of spaced vertically disposed hollow base supports comprising a right base support and a left base support, each of the right base support and the left base support having an open top end, a bottom end, a front side, a back side, a cavity disposed from the top end to the bottom end, and a plurality of spaced circular first apertures disposed from the front side to the back side proximal the bottom end;
   a horizontally disposed cross support having a right end, a left end, a front surface, a rear surface, and a plurality of spaced circular second apertures disposed from the front surface to the rear surface proximal each of the right end and the left end;
   wherein a diameter of each of the plurality of first apertures is equal to a diameter of each of the plurality of second apertures;
   a pair of screws comprising a right screw and a left screw, each of the right screw and the left screw having a knobbed head and a length greater than a combined width of one of the pair of base supports and the cross support, wherein each of the right screw and the left screw is selectively slidably securable through one of the plurality of first apertures and one of the plurality of second apertures proximal the cross support right end and the cross support left end, respectively;
   a pair of openings comprising a right opening and a left opening, each of the right opening and the left opening disposed through the right base support and the left base support, respectively, from the front side to the back side proximal the top end;
   a pair of tubular sleeves comprising a right sleeve and a left sleeve, each of the right sleeve and the left sleeve continuously disposed through the right opening and the left opening, respectively;
   a pair of tubular rods comprising a right rod and a left rod, each of the right rod and the left rod having a rear end slidably engageable through the right sleeve and the left sleeve, respectively;

a pair of frontward facing hooks comprising a right hook and a left hook, each of the right hook and the left hook having a back surface attached to the front side of each of the right base support and the left base support, respectively, proximal the top end; and a pair of padded supports comprising a right padded support and a left padded support, each of the right padded support and the left padded support slidably moveable along the right rod and the left rod, respectively;

wherein a pull-up bar frame is selectively slidably engageable within the cavity of the pair of base supports from the top end to the pair of sleeves.

2. The exercise attachment apparatus of claim 1 further comprising:

a pair of stabilizing lower attachment members comprising a right stabilizing lower attachment member and a left stabilizing lower attachment member, each of the right stabilizing lower attachment and the left stabilizing lower attachment member having a hollow triangulated base portion and a vertical extension member, the vertical extension member having a top area, a front area, a rear area, a front slot disposed on the front area proximal the top area, and a rear slot disposed on the rear area proximal the top area;

wherein the top area of each of the right stabilizing lower attachment member and the left stabilizing lower attachment member is telescopically and removably attachable to the bottom end of the right base support and the left base support, respectively.

3. The exercise attachment apparatus of claim 1 wherein each of the pair of padded supports is rectangular.

4. The exercise attachment apparatus of claim 1 wherein each of the pair of padded supports is rubberized.

5. The exercise attachment apparatus of claim 1 wherein the each of the pair of base supports, the cross support, and each of the pair of rods is steel.

6. An exercise attachment apparatus comprising:

a pair of spaced vertically disposed hollow base supports comprising a right base support and a left base support, each of the right base support and the left base support having an open top end, a bottom end, a front side, a back side, a cavity disposed from the top end to the bottom end, and a plurality of spaced circular first apertures disposed from the front side to the back side proximal the bottom end;

a horizontally disposed cross support having a right end, a left end, a front surface, a rear surface, and a plurality of spaced circular second apertures disposed from the front surface to the rear surface proximal each of the right end and the left end;

wherein a diameter of each of the plurality of first apertures is equal to a diameter of each of the plurality of second apertures;

a pair of screws comprising a right screw and a left screw, each of the right screw and the left screw having a knobbed head and a length greater than a combined width of one of the pair of base supports and the cross support, wherein each of the right screw and the left screw is selectively slidably securable through one of the plurality of first apertures and one of the plurality of second apertures proximal the cross support right end and the cross support left end, respectively;

a pair of openings comprising a right opening and a left opening, each of the right opening and the left opening disposed through the right base support and the left base support, respectively, from the front side to the back side proximal the top end;

a pair of tubular sleeves comprising a right sleeve and a left sleeve, each of the right sleeve and the left sleeve is continuously disposed through the right opening and the left opening, respectively;

a pair of tubular rods comprising a right rod and a left rod, each of the right rod and the left rod having a rear end slidably engageable through the right sleeve and the left sleeve, respectively;

a pair of frontward facing hooks comprising a right hook and a left hook, each of the right hook and the left hook having a back surface attached to the front side of each of the right base support and the left base support, respectively, proximal the top end;

a pair of rectangular rubberized padded supports comprising a right padded support and a left padded support, each of the right padded support and the left padded support slidably moveable along the right rod and the left rod, respectively;

wherein a pull-up bar frame is selectively slidably engageable within the cavity of the pair of base supports from the top end to the pair of sleeves;

wherein the each of the pair of base supports, the cross support, and each of the pair of rods is steel; and a pair of stabilizing lower attachment members comprising a right stabilizing lower attachment member and a left stabilizing lower attachment member, each of the right stabilizing lower attachment and the left stabilizing lower attachment member having a hollow triangulated base portion and a vertical extension member, the vertical extension member having a top area, a front area, a rear area, a front slot disposed on the front area proximal the top area, and a rear slot disposed on the rear area proximal the top area;

wherein the top area of each of the right stabilizing lower attachment member and the left stabilizing lower attachment member is telescopically and removably attachable to the bottom end of the right base support and the left base support, respectively.

* * * * *